United States Patent [19]

Yancy

[11] Patent Number: 5,040,491
[45] Date of Patent: Aug. 20, 1991

[54] BIRD FEEDER

[76] Inventor: William C. Yancy, 3741 Seabrook Isl. Rd., Johns Island, S.C. 29455

[21] Appl. No.: 614,273

[22] Filed: Nov. 16, 1990

[51] Int. Cl.[5] ............................................. A01K 39/00
[52] U.S. Cl. ..................................... 119/57.8; 119/24; D30/128
[58] Field of Search ................... 119/57.8, 51.01, 52.2, 119/24, 23, 29, 18; D30/123, 124, 125, 126, 127, 128

[56] References Cited

U.S. PATENT DOCUMENTS

| D. 103,963 | 4/1937 | Butler | 119/57.8 |
| 1,749,497 | 3/1930 | McGlashan | 119/24 |
| 2,707,937 | 5/1955 | Herman | 119/29 |
| 4,542,714 | 9/1985 | Ingraham et al. | 119/29 |
| 4,986,219 | 1/1991 | Harris | 119/57.8 |

Primary Examiner—John G. Weiss
Attorney, Agent, or Firm—Lawrence I. Field

[57] ABSTRACT

A bird feeder and chimes are supported so that birds arriving at the feeder will actuate the chimes so as to call attention to their arrival.

5 Claims, 1 Drawing Sheet

U.S. Patent    Aug. 20, 1991    5,040,491
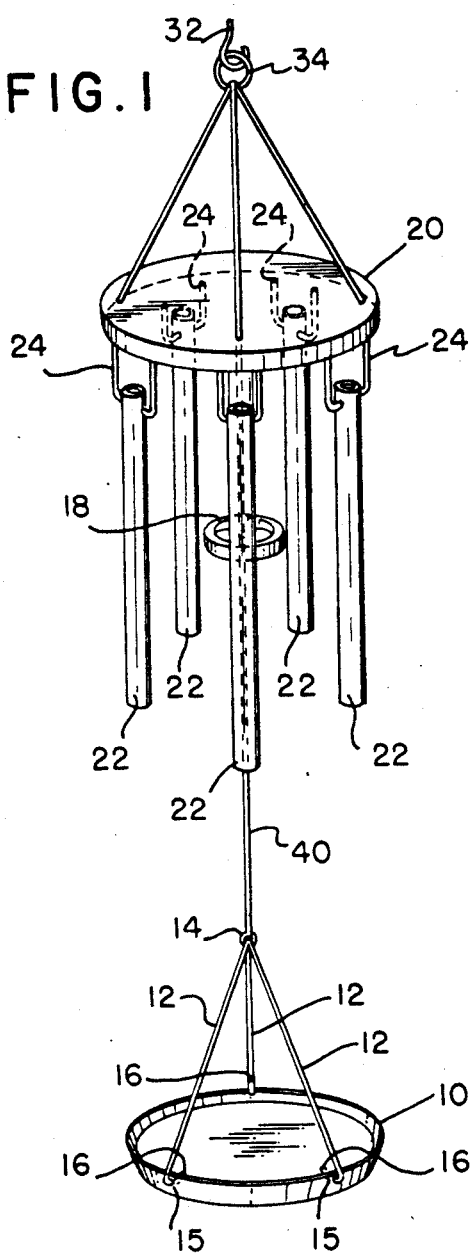
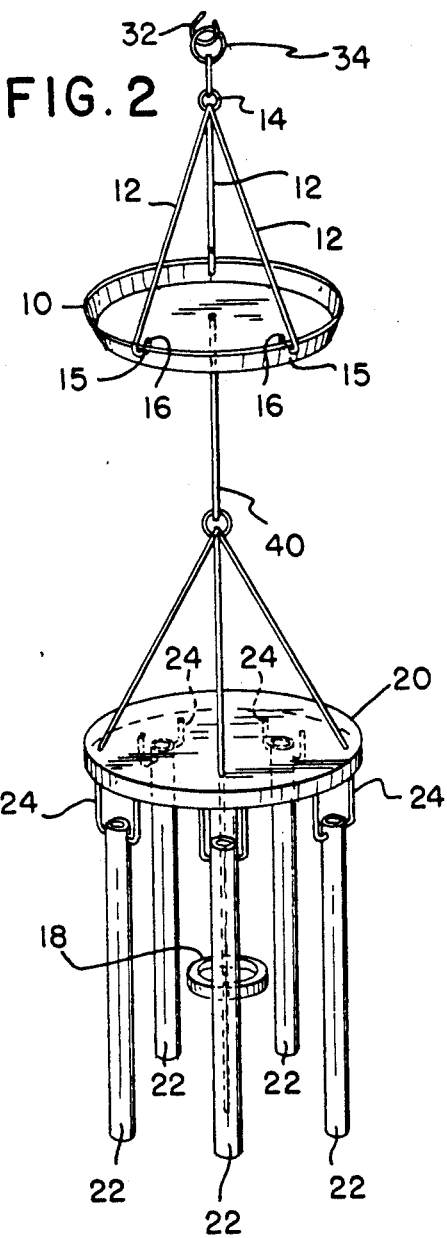
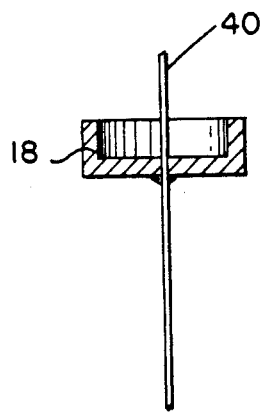
FIG. 3
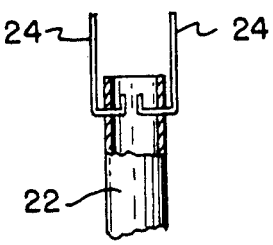
FIG. 4

BIRD FEEDER

This invention relates to a bird feeder with chimes.

One object of the invention is to provide a novel bird feeder in combination with a set of chimes.

It is a further object of this invention to provide a bird feeder which activates a striker for a set of chimes when a bird alights on the feeder.

These and other objects of the present invention will be seen from the description which follows taken in conjunction with the drawings in which:

FIG. 1 is a view in perspective of a preferred embodiment of the invention;

FIG. 2 is a similar view of another embodiment of the invention. FIG. 3 shows details of the striker disc 18, and FIG. 4, shows a detail of the chime suspension.

As shown in FIG. 1 of the drawings, the device of this invention includes a feeder which may be a bowl-shaped pan 10 and means to suspend the pan from a suitably mounted support. The support includes a hook 32 which when secured to a tree branch, or pole, or other means, (not shown) supports the feeder and chimes. Hook 32 is provided to engage an eye or loop 34 from which both a feeder and a set of chimes are suspended.

The bird feeder shown in FIG. 1 includes a pan 10 suspended by three or more guy wires 12 each of which extends from a loop 14 to a location 15 adjacent to the periphery of the pan 10. One method of attaching wires 12 to pan 10 is by a hook 16 formed on the lower end of each wire. Each Hook 16 is received in an aperture provided near the edge of pan 10. Instead of termination in hooks 16, wires 12 could, if desired, form a sling to support pan 10. Other means of suspending pan 10 may be provided so long as they permit birds to fly to the pan and perch on the same when partaking of the bird seed, nuts, raisins or other food provided for them to eat.

A centrally located wire 40 extends from loop 14 up to eye or loop 34. Intermediate of loops 14 and 34 is an annular disk 18 which is secured to wire 40, by brazing, soldering, or by other adhesive depending on whether disk 18 is metallic, ceramic, plastic or glass. Disk 18 may have a dished configuration such as that shown in FIG. 3 which permits it to support a small amount of bird seed so as to serve as a supplement to the main feeder, pan 10. Disk 18 also serves as a striker for a set of chimes.

The set of chimes comprises a circular or polygonal block 20 which supports a plurality of rods 22 which constitute the chimes of this invention. Rods 22 are either metal, glass, ceramic or plastic, the material being such that when striker disk 18 strikes them, sound is produced. Each of rods 22 is pivotably suspended by hangar means 24 which permit the lower end of the rods to swing inwardly toward centrally located wire 40 and strike the disk 18. Rods may be round, or they may be polygonal, or thin flat slats.

When the device of this invention has been hung and bird food has been placed in pan 10 and in striker disk 18, arrival of the birds will cause the rods 22 to strike the disc 18 and produce a sound. When the birds hear this and observe that nothing untoward accompanies the sound, curiosity causes them to alight on either the pan 10 or the striker 18 and to feed and when they fly away the chimes again sound, marking their departure.

Thus if an individual wishes to observe the feeding habits of the birds the chimes will summon that person to the feeder to observe the birds until they fly away.

It is also possible for the chimes to be suspended from below the feeder pan or even from the pan itself. This is shown in FIG. 2 and other changes may be made without departing from the spirit of this invention as defined in the appended claims.

I claim:

1. A bird feeder and chimes which comprises in combination:
   a least one feeding means for holding a supply of bird food,
   support means for suspending said feeding means, and
   a set of chimes suspended by the same said support means
   whereby the arrival of a bird at the feeding means causes the chimes to sound.

2. The bird feeder of claim 1 including in addition a striker for sounding said chimes, said striker being suspended centrally of the chimes.

3. The bird feeder of claim 2 including means for suspending the chimes which permit them to swing freely.

4. The bird feeder of claim 1 wherein the support means is located centrally of the chimes and of the striker and of the feeding means.

5. The bird feeder of claim 1 in which the individual chimes are disposed around a central axis which coincides with the axis of said support means.

* * * * *